United States Patent

Dang et al.

(10) Patent No.: US 9,644,616 B2
(45) Date of Patent: May 9, 2017

(54) DISC-TYPE CONCENTRATOR AND SOLAR THERMAL POWER GENERATION SYSTEM COMPRISING THE SAME

(75) Inventors: Anwang Dang, Xiangtan (CN); Yingzhao Ma, Xiangtan (CN); Kai Zhu, Xiangtan (CN); Min Huang, Xiangtan (CN); Shuai Liu, Xiangtan (CN); Bugen Wang, Xiangtan (CN); Xuegao Fu, Xiangtan (CN)

(73) Assignees: Xiangtan Liyuan Electric Tooling Co., Ltd. (CN); Xiangtan Electric Manufacturing Co., Ltd. (CN)

( * ) Notice: Subject to any disclaimer, the term of this patent is extended or adjusted under 35 U.S.C. 154(b) by 534 days.

(21) Appl. No.: 14/345,326

(22) PCT Filed: Apr. 26, 2012

(86) PCT No.: PCT/CN2012/074739
§ 371 (c)(1),
(2), (4) Date: Mar. 17, 2014

(87) PCT Pub. No.: WO2013/053222
PCT Pub. Date: Apr. 18, 2013

(65) Prior Publication Data
US 2014/0345277 A1    Nov. 27, 2014

(30) Foreign Application Priority Data

Oct. 13, 2011    (CN) .......................... 2011 1 0309055

(51) Int. Cl.
*F24J 2/40*    (2006.01)
*F03G 6/06*    (2006.01)
(Continued)

(52) U.S. Cl.
CPC ........ *F03G 6/06* (2013.01); *F24J 2/15* (2013.01); *F24J 2/54* (2013.01); *G02B 19/0019* (2013.01);
(Continued)

(58) Field of Classification Search
CPC .......... F03G 2006/062; G02B 19/0019; G02B 17/00; G02B 26/0841; G02B 5/08;
(Continued)

(56) References Cited

U.S. PATENT DOCUMENTS 4,373,512 A    2/1983   Hirt
4,463,749 A *  8/1984   Sobczak ................... F24J 2/10
                                                          126/605

(Continued)

FOREIGN PATENT DOCUMENTS

CN    2155531 Y    2/1994
CN    2597897 Y    1/2004
(Continued)

OTHER PUBLICATIONS

International Search Report for Application No. PCT/CN2012/074739 dated Aug. 9, 2012.

*Primary Examiner* — Jason Lau
(74) *Attorney, Agent, or Firm* — Lerner, David, Littenberg, Krumholz & Mentlik, LLP

(57) ABSTRACT

A disc-type concentrator comprises a disc rack vertical post, a disc rack, a rotating shaft, a rotating reflection mirror, a power driving device, and a control system. The rotating shaft is arranged on the disc rack and rotatably connected with the disc rack. The rotating reflection mirror is arranged on a side of the rotating shaft and fixedly connected with the rotating shaft. The power driving device is arranged on the disc rack or on the back surface of the rotating reflection mirror and driving the rotating reflection mirror to rotate.

(Continued)

The control system is connected with the power driving device and controlling the working state of the power driving device.

16 Claims, 7 Drawing Sheets

(51) Int. Cl.
    *F24J 2/54*     (2006.01)
    *G02B 19/00*     (2006.01)
    *F24J 2/15*     (2006.01)

(52) U.S. Cl.
    CPC .... *G02B 19/0033* (2013.01); *F03G 2006/062* (2013.01); *Y02E 10/46* (2013.01); *Y02E 10/47* (2013.01)

(58) Field of Classification Search
    CPC .......... G02B 15/14; G02B 7/022; G02B 7/00; G02B 7/102; F24J 2/16; F24J 2002/1019; F24J 2/10; F24J 2002/1076; F24J 2/40; F24J 2002/5468; F24J 2/06; F16B 21/065; F16B 25/0031; F16B 25/10; F16B 27/00; F16B 37/00

See application file for complete search history.

(56) References Cited

U.S. PATENT DOCUMENTS

| | | | |
|---|---|---|---|
| 4,536,847 A | | 8/1985 | Erickson et al. |
| 5,325,844 A | * | 7/1994 | Rogers ........................ F24J 2/10 |
| | | | 126/600 |
| 2010/0252030 A1 | * | 10/2010 | Marcotte .................... F24J 2/14 |
| | | | 126/694 |

FOREIGN PATENT DOCUMENTS

| | | |
|---|---|---|
| CN | 101526275 A | 9/2009 |
| CN | 101608836 A | 12/2009 |
| CN | 201412976 Y | 2/2010 |
| CN | 201429240 Y | 3/2010 |
| CN | 101813038 A | 8/2010 |
| CN | 201739107 U | 2/2011 |
| CN | 102150282 A | 8/2011 |
| CN | 102360116 A | 2/2012 |

\* cited by examiner

DISC-TYPE CONCENTRATOR AND SOLAR THERMAL POWER GENERATION SYSTEM COMPRISING THE SAME

CROSS-REFERENCE TO RELATED APPLICATIONS

The present application is a national phase entry under 35 U.S.C. §371 of International Application No. PCT/CN2012/074739 filed Apr. 26, 2012, which claims priority right from Chinese Patent Application No. 201110309055.7 filed Oct. 13, 2011, all of which are hereby incorporated herein by reference.

FIELD OF THE INVENTION

The present invention relates to the field of solar energy utilization, and more specifically, to a disc-type concentrator and solar thermal power generation system comprising the same.

DESCRIPTION OF THE PRIOR ART

Given the increasing scarcity of conventional energy sources across the world right now, solar energy becomes popular and attracts attention in all countries thanks to its infinite reserves, wide spread, cleanliness in utilization and economic benefits. Solar thermal power generation is an importation direction of solar energy development and utilization. In the field of solar thermal power generation, there are three main technical pathways, groove-type, tower-type and disc-type, according to different ways of concentration. Disc-type solar thermal power generation is increasingly popular on the market due to its capability of flexible modular deployment, relatively high concentration ratio, convenient two dimensional tracking system, adaptation to an environment of scarcity, flexible power station construction modes, low interference to a power grid as a result of equipment failure, and in particular its photoelectric conversion efficiency up to 32 to 38% with the employment of Stirling engine in a disc-type power generation system.

Currently, a disc-type solar thermal power generation system is primarily composed of a disc-type concentrator, an engine (steam turbine, gas turbine, Stirling engine), and a tracking control system, wherein the disc-type concentrator comprises posts, disc rack, and many pieces of reflection mirror secured onto the disc racks. When this type of disc-type concentrator is made and set up, its reflection mirror is stationary relative to the disc rack, and the concentrated energy cannot be adjusted, which leads to significant technical difficulties in the commissioning and operation of the entire system. For example, at the early stage of commissioning a disc-type solar thermal power generation system, the heat engine system is not yet steady in operations, and the required energy needs to change. However, the disc-type concentrator inputs a fixed amount of energy into the heat collector of the heat engine. As the heat collector of the heat engine does not promptly lead the heat away, the temperature of the heat collector will consequently increase consistently and may even be burnt; when a heat engine fails or deviates from the normal working point, the energy required by the heat engine also needs to vary, otherwise the heat collector of the heat engine may also be burnt; when a heat engine runs normally, the concentrated energy by a disc-type concentrator varies significantly due to the difference between the sunlight intensity in morning and at noon, and the power outputted by the heat engine system consequently varies significantly, which will make the heat engine system deviate too far from the optimal working point and result in a greatly decreased efficiency.

It can be seen that the concentrated energy by current disc-type concentrators cannot be adjusted, and the inability to adjust the concentrated energy leads to significant technical difficulties in the commissioning and operation of a system with a disc-type concentrator.

SUMMARY OF THE INVENTION

In light of this, the present invention provides a disc-type concentrator that comprises a rotating reflection mirror so as to achieve the adjustable control of the energy concentrated by the disc-type concentrator; the present invention further provides a disc-type solar thermal power generation system that comprises the above disc-type concentrator.

To attain the above object, the present invention provides the following technical solution:

A disc-type concentrator, comprising a disc rack vertical post and a disc rack, and said disc-type concentrator further comprising:

A rotating shaft with the two ends thereof arranged on the disc rack and rotatably connected with the disc rack;

A rotating reflection mirror arranged on the side of the rotating shaft and fixedly connected with the rotating shaft;

A power driving device arranged on the disc rack or on the back surface of the rotating reflection mirror and driving the rotating reflection mirror to rotate;

A control system connected with the power driving device and controlling the working state of the power driving device.

Preferably, at least two rotating shaft supports are disposed between the disc rack and the rotating reflection mirror, each of the rotating shaft supports is formed with a through-hole, the rotating shaft is in interference fit with the rotating shaft supports through the through-holes, the positions of the at least two rotating shaft supports are symmetrical about the center line of the rotating reflection mirror, and the center of gravity of the rotating reflection mirror falls on the left side of the rotating shaft supports.

Preferably, said disc-type concentrator further comprises:

A rotation limiting plate arranged on the disc rack to prevent the rotating reflection mirror from having an overly big rotation angle to cause damages to the rotating reflection mirror;

A reset plate arranged on the disc rack with the same position as the normal working position of the rotating reflection mirror, the normal working position of the rotating reflection mirror being the position of the rotating reflection mirror when the reflected light of the rotating reflection mirror is concentrated on the working object of the disc-type concentrator.

Preferably, the rotation limiting plate and the reset plate are provided with sensing elements, respectively, the sensing elements are connected to the control system, the power driving device is arranged on the disc rack, the power driving device rotates the rotating shaft through a power transmission element, the rotating shaft drives the rotating reflection mirror to rotate, and the control system controls the working state of the power driving device according to the information transmitted from the sensing element of the rotation limiting plate and the sensing element of the reset plate.

Preferably, a reset spring is provided between the rotating reflection mirror and the disc rack, the power driving device is arranged on the back surface of the rotating reflection mirror, the driving power of the power driving device directly acts on the rotating reflection mirror, the rotating reflection mirror rotates through the support by the rotating shaft, and the reset spring resets the rotating reflection mirror to the position of the reset plate when the power driving device stops working.

Preferably, the reset spring maintains certain deformation when the rotating reflection mirror is at the normal working position, and the reset plate limits the rotation of the rotating reflection mirror due to the deformation of the reset spring.

Preferably, a plurality of the rotating reflection mirrors that are on the same radial direction of the disc rack are arranged on the same rotating shaft.

Preferably, said disc-type concentrator further comprises fixed reflection mirrors that are fixedly arranged on the disc rack.

Preferably, the fixed reflection mirrors and the rotating reflection mirrors are arranged as a ring in the disc rack, the fixed reflection mirrors are arranged on the external rings of the disc rack, and the rotating reflection mirrors are arranged on the internal rings of the disc rack.

The present invention further provides a disc-type solar thermal power generation system that comprises a disc-type concentrator, an engine and a tracking control system, said disc-type concentrator specifically being the above disc-type concentrator.

It can be seen from the above technical solution that the disc-type concentrator provided by the present invention comprises a rotating shaft arranged in the disc rack with the two ends thereof rotatably connected with the disc rack, a rotating reflection mirror is arranged on the side of the rotating shaft and fixedly connected with the rotating shaft, a power driving device is arranged on the back surface of the rotating reflection mirror or on the disc rack and drives the rotating reflection mirror to rotate, and the working state of the power driving device is controlled by a control system connected with the power driving device. When the disc-type concentrator needs to adjust the concentrated energy, apparently, the control system controls the power driving device to operate, the power driving device provides rotating power to the rotating reflection mirror, the rotating reflection mirror rotates under the driving or supporting action of the driving shaft to change the direction of reflected light from the rotating reflection mirror, which realizes the adjustable control of energy concentrated by the disc-type concentrator.

BRIEF DESCRIPTION OF THE DRAWINGS

To describe technical solutions according to the examples of the present invention or the prior art more clearly, figures to be used in the description of the examples or the prior art will be briefly described below. Apparently, the figures in the following description are only a few examples of the present invention. To those skilled in the art, other figures may be obtained according to these figures without making inventive effort.

DETAILED DESCRIPTION OF SPECIFIC EMBODIMENTS

The technical solutions according to the examples of the present invention will be described clearly and fully with reference to the accompanying drawings in the examples of the present invention. Apparently, the described examples are only a part of, examples of the present invention, not all examples thereof. All other examples obtained by those skilled in the art based on the examples in the present invention without making inventive effort shall be encompassed by the scope of the present invention.

Figure 1:
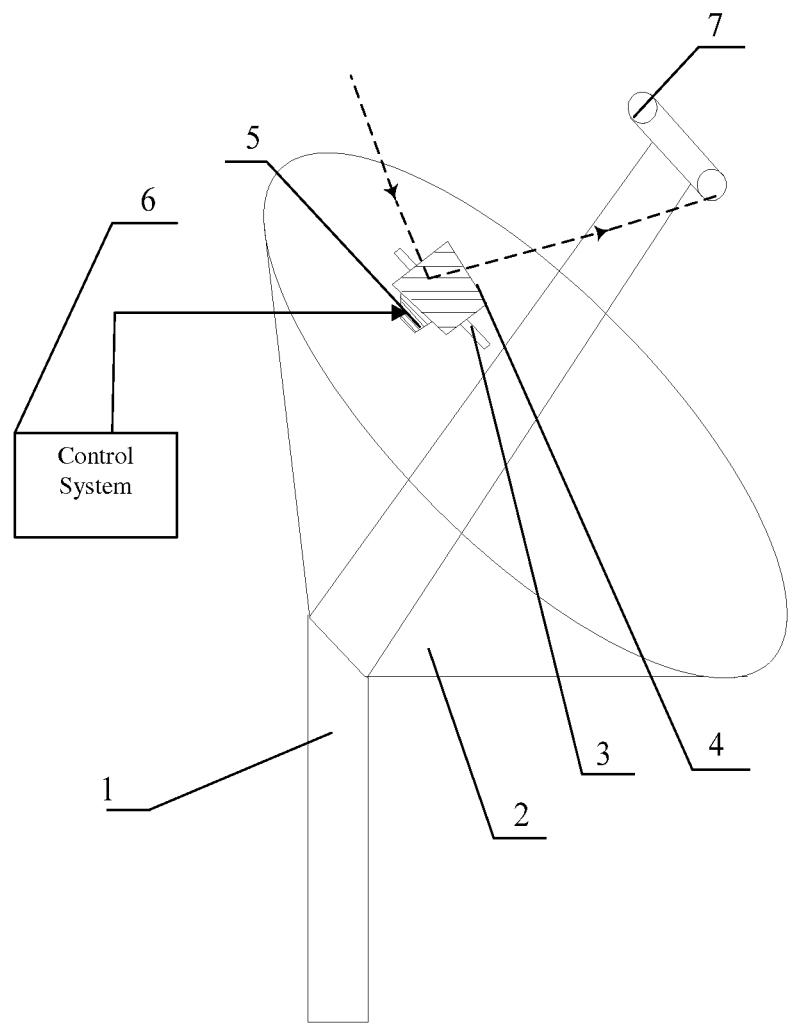
FIG. 1 illustrates the structure of Example I of a disc-type concentrator according to the present invention.

The examples of the present invention disclose a disc-type concentrator that comprises a rotating reflection mirror to realize the adjustable control of energy concentrated by the disc-type concentrator. FIG. 1 illustrates the structure of Example I of a disc-type concentrator according to the present invention. As shown in FIG. 1, the disc-type concentrator comprises a disc rack vertical post 1, a disc rack 2, a rotating shaft 3, a rotating reflection mirror 4, a power driving device 5, and a control system 6. A solar heat utilization apparatus 7 is the working object of the disc-type concentrator and absorbs the energy concentrated by the disc-type concentrator. The disc rack vertical post 1 is used to support the disc rack 2, two ends of the rotating shaft 3 are placed in the disc rack 2, the rotating shaft 3 is rotatably connected with the disc rack 2, and when an external force is applied on the rotating shaft 3, the rotating shaft 3 may rotate about itself. The rotating reflection mirror 4 is arranged on the side of the rotating shaft 3, the rotating shaft 3 is fixedly connected with the rotating reflection mirror 4, and the rotating shaft 3 may drive the rotating reflection mirror 4 to rotate through its own rotation; apparently, when an external force is applied on the rotating reflection mirror 4, the rotating reflection mirror 4 may also rotate through the support of the rotating shaft 3. The power driving device 5 is arranged on the back surface of the rotating reflection mirror 4 for driving the rotating reflection mirror 4 to rotate, the power generated by the power driving device 5 directly acts on the rotating reflection mirror 4, the rotating reflection mirror 4 begins to rotate through the support of the rotating shaft 3 as driven by the power driving device 5, and the power driving device 5 may be a hydraulic system or an electric magnet. Apparently, the power driving device 5 may also be arranged on the disc rack 2 at a position close to the rotating shaft 3, the power driving device 5 drives the rotating shaft 3 to rotate through a power transmission element, which in turn drives the rotating reflection mirror 4 to rotate, the power driving device 5 may be a driving motor, and the corresponding power transmission element may be gears, chains, worm and wormwheel, and hinges. Apparently, the power driving device 5 may be any power driving system that can drive the rotating reflection mirror 4 to rotate, and is not limited to the limitation on the power driving device 5 in this example. The control system 6 is connected with the power driving device 5 for controlling the working state of the power driving device 5, and the control system 6 may be placed remotely to perform remote monitoring on the power driving device 5. The solar heat utilization apparatus 7 is fixed above the disc rack 2 through a support post extended from the central point of the disc rack 2, and the solar heat utilization apparatus 7 absorbs the energy concentrated by the disc-type concentrator.

Figure 2:
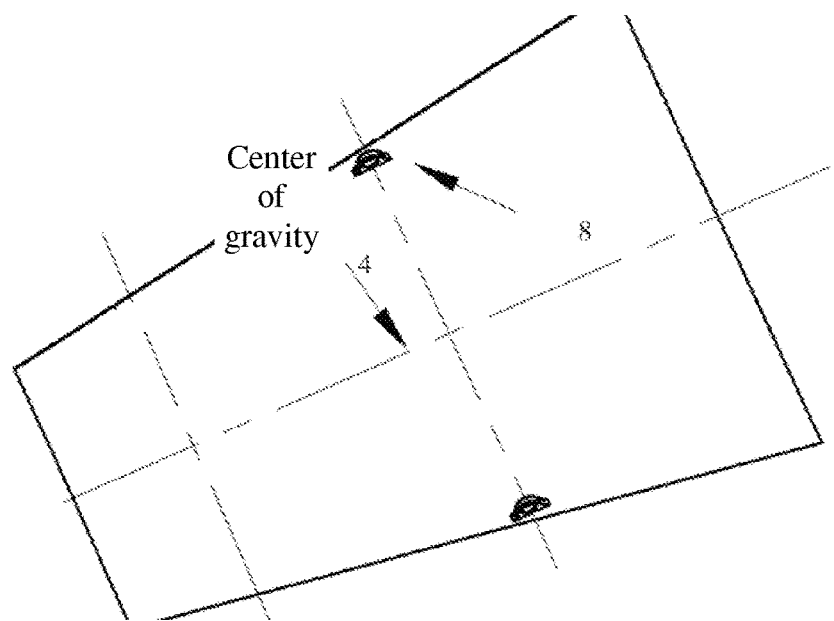
FIG. 2 illustrates the installation of the rotating reflection mirror of the disc-type concentrator according to the present invention.

FIG. 2 is an installation diagram of the rotating reflection mirror of the disc-type concentrator according to the present invention. As shown in FIG. 1 and FIG. 2, two rotating shaft supports 8 are disposed between the rotating reflection mirror 4 and the disc rack 2, one end of the rotating shaft support 8 is fixedly installed on the disc rack 2, the other end is fixedly installed on the back surface of the rotating reflection mirror 4, the positions of the two rotating shaft supports 8 are symmetrical about the center line of the rotating reflection mirror 4, and the center of gravity of the rotating reflection mirror 4 falls on the left side of the line that links the two rotating shaft supports 8, the center position of each of the two rotating shaft supports 8 is formed with a through-hole, the rotating shaft 3 is installed in the through-holes of the two rotating shaft supports 8, which realizes interference fit between the rotating shaft 3 and the rotating shaft supports 8.

Preferably, the rotating shaft supports 8 may be fixedly installed on the disc rack 2 by means of welding. If the rotating reflection mirror 4 has its own metal support parts, the rotating shaft supports 8 may also be fixedly installed on the back surface of the rotating reflection mirror 4 by means of welding; otherwise, the rotating shaft supports 8 may be glued the back surface of the rotating reflection mirror 4.

Preferably, the rotating shaft 3 may be divided into two rotating shaft segments, said two rotating shaft segments are installed in the through-holes of each rotating shaft support 8, respectively, said two rotating shaft segments are coaxial and in interference fit with the through-holes of their respective rotating shaft support 8. One segment of the rotating shaft 3 plays the role of supporting the rotating reflection mirror 4, and the other segment plays the role of driving the rotating reflection mirror 4 to rotate.

Apparently, the installation method for the rotating reflection mirror shown in FIG. 2 is only one preferred installation method for the rotating reflection mirror of the disc-type concentrator according to the present invention. Other installation methods may also be used, for example the installation of the rotating reflection mirror can be realized through the engagement between a bearing and a rotating shaft. The installation method for the rotating reflection mirror shown in FIG. 2 is only a description made to facilitate the understanding of the principle of the installation of the rotating reflection mirror according to the present invention, which shall not be a limitation to the installation methods thereof.

Apparently, a plurality of rotating shafts 3 and rotating reflection mirrors 4 may be arranged in the disc rack 2, one rotating reflection mirror 4 is provided with at least one rotating shafts 3, and the amount of rotating reflection mirrors 4 may be determined according to the energy absorbed by the heat collector of the solar heat utilization apparatus 7 at the early stage of commissioning or during the normal operations thereof. A plurality of rotating reflection mirrors 4 may also share one rotating shafts 3, and the rotation of a plurality of rotating reflection mirrors 4 is realized through one rotating shafts 3, and a plurality of rotating reflection mirrors 4 on the same rotating shafts 3 form an array of rotating reflection mirrors 4. For example, a plurality of rotating reflection mirrors 4 on the same radial direction of the disc rack 2 may form an array of rotating reflection mirrors 4. Apparently, the circumstance in which the rotating reflection mirror 4 is provided with at least one rotating shafts 3 and the circumstance in which a plurality of rotating reflection mirrors 4 share one rotating shafts may be combined as required by the work of the disc-type concentrator.

The process that the disc-type concentrator adjusts the concentrated energy is specifically as follows: when the solar heat utilization apparatus 7 works normally, the reflected light from all rotating reflection mirrors 4 in the disc rack 2 is concentrated on the heat collector of the solar heat utilization apparatus 7. When the solar heat utilization apparatus 7 needs to reduce the absorbed energy, the control system 6 receives a signal for reducing the concentrated energy, the control system 6 controls the power driving device 5 to operate, the power driving device 5 drives the rotating reflection mirrors 4 to rotate such that the reflected light direction of the rotating reflection mirrors 4 changes, and the reflected light is no longer concentrated on the heat collector of the solar heat utilization apparatus 7. The amount of the rotating reflection mirrors 4 whose rotation is controlled by the control system 6 may be determined according to the concentrated energy to be reduced by the disc-type concentrator. Ways in which the power driving device 5 drives the rotating reflection mirrors 4 to rotate include: the power driving device 5 drives the rotating shaft 3 to drive the rotating reflection mirrors 4 to rotate, or the power driving device 5 directly drives the rotating reflection mirrors 4, and the rotation of the rotating reflection mirrors 4 is realized under the support of the rotating shaft 3.

Furthermore, one power driving device 5 is not limited to only driving one rotating reflection mirror 4. According to actual operation needs, one power driving device 5 may drive a plurality of rotating reflection mirrors 4, e.g. one power driving device 5 drives an array of rotating reflection mirrors 4. The control system 6 controls a plurality of power driving devices 5 at the same time. According to actual operation needs, the control system 6 controls a certain amount of power driving devices 5 to work so as to drive rotating reflection mirrors 4 to rotate in an amount corresponding to said amount of power driving devices 5, thereby realizing the adjustment to the concentrated energy by the disc-type concentrator. The amount of power driving devices 5 whose work is controlled by the control system 6 should meet the demand by the disc-type concentrator to adjust the concentrated energy.

Furthermore, the solar heat utilization apparatus 7 may be further provided with a sensing element, said sensing element is connected with the control system 6, when the sensing element senses that the working temperature of the solar heat utilization apparatus is too high and exceeds a predetermined value of working temperature, said sensing element converts the heat signal to an electric signal that is transmitted to the control system 6, when the control system 6 receives said signal, it controls a certain amount of the rotating reflection mirrors 4 to rotate, thereby adjusting the concentrated energy by the disc-type concentrator and reducing the energy concentrated on the solar heat utilization apparatus 7; when the sensing element of the solar heat utilization apparatus 7 senses that the solar heat utilization apparatus absorbs relatively a small amount of energy, said sensing element converts the heat signal to an electric signal that is transmitted to the control system 6, when the control system 6 receives said signal, it controls the rotating reflection mirrors 4 to reset, thereby increasing the energy concentrated on the solar heat utilization apparatus 7.

The disc-type concentrator disclosed in the example of the present invention comprises a rotating shaft arranged in its disc rack with the two ends thereof rotatably connected with the disc rack, a rotating reflection mirror is arranged on the side of the rotating shaft and fixedly connected with the rotating shaft, a power driving device is arranged on the back surface of the rotating reflection mirror or on the disc rack and drives the rotating reflection mirror to rotate, and the working state of the power driving device is controlled by a control system connected with the power driving device. When the disc-type concentrator needs to adjust the concentrated energy, apparently, the control system controls the power driving device to operate, thereby driving the rotating reflection mirror to rotate so as to change the direction of reflected light from the rotating reflection mirror, which realizes the adjustable control of energy concentrated by the disc-type concentrator.

Figure 3:
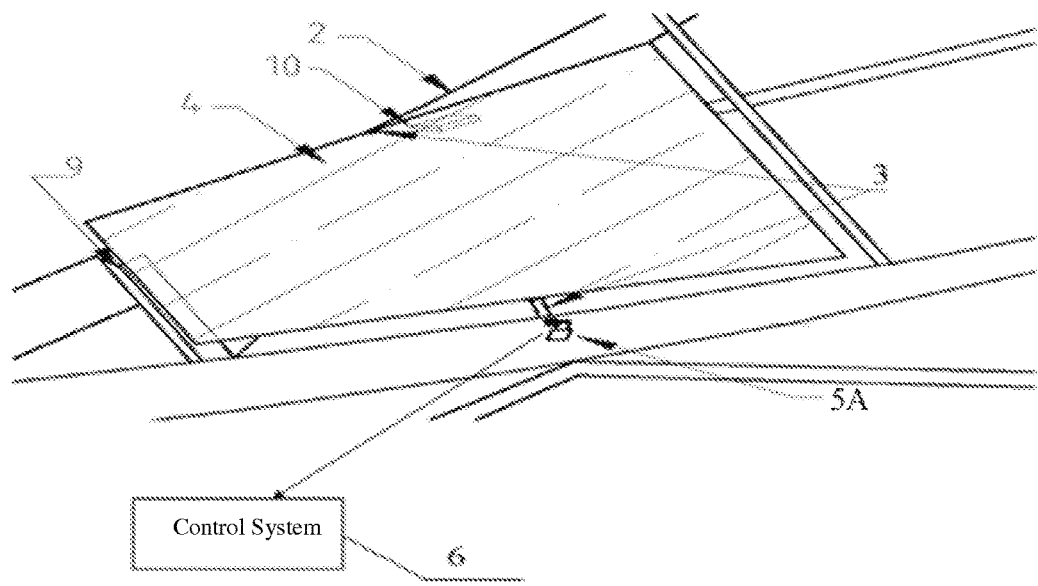
FIG. 3 illustrates the structure that a driving motor drives the rotating reflection mirror.

FIG. 3 illustrates the structure that a driving motor drives the rotating reflection mirror. FIG. 3 is a partial view of the disc-type concentrator shown in FIG. 1 for illustrating the working principle based on which a driving motor drives the rotating reflection mirror. Compared with the disc-type concentrator shown in FIG. 1, the disc rack 2 of the disc-type concentrator shown in FIG. 3 is further provided with a reset plate 9 and a rotation limiting plate 10, the position of the reset plate 9 is the same as the normal working position of the rotating reflection mirror 4, the normal working position of the rotating reflection mirror 4 being the position of the rotating reflection mirror 4 on the disc rack 2 when the reflected light of the rotating reflection mirror 4 is concentrated on the heat collector of the solar heat utilization apparatus 7; provided that the reflected light of the rotating reflection mirror 4 deviates from the heat collector of the solar heat utilization apparatus 7, the rotation limiting plate 10 limits the rotation angle of the rotating reflection mirror 4 and prevents the rotating reflection mirror 4 from having an overly big rotation angle to cause damages.

Compared with the disc-type concentrator shown in FIG. 1, the power driving device 5A shown in FIG. 3 is more specific. The power driving device 5A shown in FIG. 3 is a driving motor, the driving motor 5A is arranged on the disc rack 2, the position of the driving motor 5A arranged on the disc rack 2 is close to the rotating shafts 3, and the driving motor 5A drives the rotating shafts 3 to rotate through gears, thereby driving the rotating reflection mirror 4 to rotate.

Preferably, the reset plate 9 and the rotation limiting plate 10 may be further provided with sensing elements, and the sensing element of the reset plate 9 and the sensing element of the rotation limiting plate 10 are connected to the control system 6, respectively.

The process that the driving motor 5A drives the rotating reflection mirror 4 to rotate is specifically as follows: when the control system 6 receives a signal for reducing the concentrated energy by the disc-type concentrator, the control system 6 controls the driving motor 5A to rotate, as the driving motor 5A rotates, the gears drive the rotating shafts 3 to start rotation, the rotating reflection mirror 4 starts to rotate as driven by the rotating shafts 3, the reflected light of the rotating reflection mirror 4 starts to deviate from the heat collector of the solar heat utilization apparatus, when the rotating reflection mirror 4 approaches the rotation limiting plate 10, the sensing element on the rotation limiting plate 10 sends a signal to the control system 6, when the control system 6 receives said signal, it controls the driving motor 5A to stop rotation, and the operation to reduce the concentrated energy by the disc-type concentrator is completed; when the control system 6 receives a signal for increasing the concentrated energy by the disc-type concentrator, the control system 6 controls the driving motor 5A to rotate in a reverse direction, and the rotation direction of the driving motor 5A at this moment is opposite to the direction when the driving motor 5A drives the rotating reflection mirror 4 to reduce the concentrated energy by the disc-type concentrator, the gears drive the rotating shafts 3 to rotate in a reverse direction, the rotating reflection mirror 4 starts to reset as driven by the rotating shafts 3, when the rotating reflection mirror 4 approaches the reset plate 9, the sensing element on the reset plate 9 sends a signal to the control system 6, when the control system 6 receives said signal, it controls the driving motor 5A to stop rotation, the operation to reset the rotating reflection mirror 4 is completed, and the concentrated energy by the disc-type concentrator starts to increase.

Figure 4:
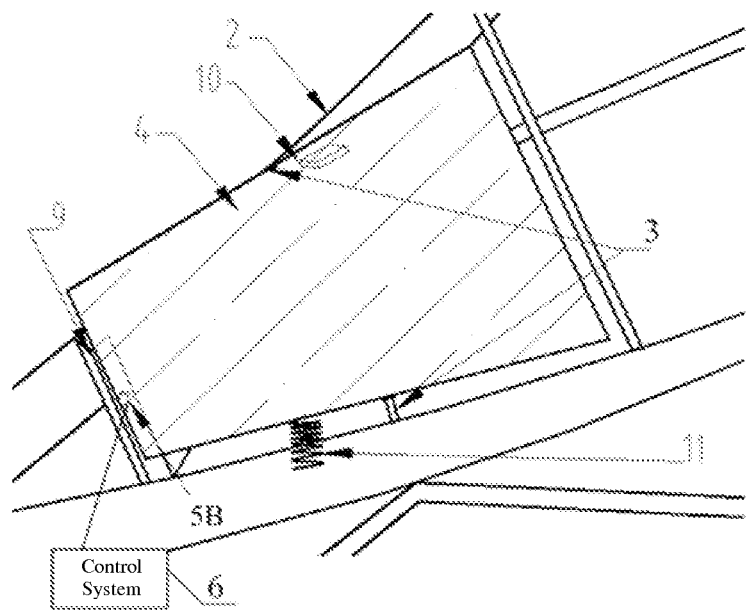
FIG. 4 illustrates the structure that a hydraulic system drives the rotating reflection mirror.

FIG. 4 illustrates the structure that a hydraulic system drives the rotating reflection mirror. FIG. 4 is a partial view of the disc-type concentrator shown in FIG. 1 for illustrating the working principle based on which a hydraulic system drives the rotating reflection mirror. Compared with the disc-type concentrator shown in FIG. 3, a reset spring 11 is further provided between the disc rack 2 and the rotating reflection mirror 4 of the disc-type concentrator shown in FIG. 4. When the rotating reflection mirror 4 is at the normal working position, the reset spring 11 maintains stability through the limiting effect by the reset plate 9, i.e. when the rotating reflection mirror 4 is at the position of the reset plate 9, the reset spring 11 maintains certain deformation, and the reset plate 9 acts as a stop plate to prevent the rotating reflection mirror 4 from deviating from the working position as pulled by the reset spring 11. When the rotating reflection mirror 4 is at the working position, the reset spring 11 maintains certain deformation, which can prevent the rotating reflection mirror 4 from shaking caused by the disc rack 2 during rotation that leads to abnormal operations of the rotating reflection mirror 4.

The power driving device of the disc-type concentrator shown in FIG. 4 uses a hydraulic system 5B, the hydraulic system 5B is arranged on the back surface of the rotating reflection mirror 4, the driving power of the hydraulic system 5B directly acts on the rotating reflection mirror 4, and drives the rotating reflection mirror 4 to rotate through the support by the rotating shaft 3.

Preferably, compared with the disc-type concentrator shown in FIG. 3, the reset plate 9 and the rotation limiting plate 10 of the disc-type concentrator shown in FIG. 4 may not be provided with sensing elements.

The process that the hydraulic system 5B drives the rotating reflection mirror 4 to rotate is specifically as follows: when the control system 6 receives a signal for reducing the concentrated energy by the disc-type concentrator, the control system 6 controls the hydraulic system 5B to operate, the hydraulic system 5B drives the rotating reflection mirror 4 to start rotation, the reflected light of the rotating reflection mirror 4 starts to deviate from the heat collector of the solar heat utilization apparatus, the deformation of the reset spring 11 increases, when the rotating reflection mirror 4 approaches the rotation limiting plate 10, the output driving force of the hydraulic system 5B remains unchanged, the balance between the rotating reflection mirror 4 and the reset spring 11 is maintained, and the operation to reduce the concentrated energy by the disc-type concentrator is completed; when the control system 6 receives a signal for increasing the concentrated energy by the disc-type concentrator, the control system 6 controls the hydraulic system 5B to release pressure, the output driving force of the hydraulic system 5B begins to decrease, under the action of the elastic potential energy generated by the deformation, the reset spring 11 drives the rotating reflection mirror 4 to rotate in a reverse direction, when it rotates to the position of the reset plate 9, the rotating reflection mirror 4 stops rotation due to the limiting effect of the reset plate 9, the operation to reset the rotating reflection mirror 4 is completed, and the concentrated energy by the disc-type concentrator starts to increase.

Figure 5:
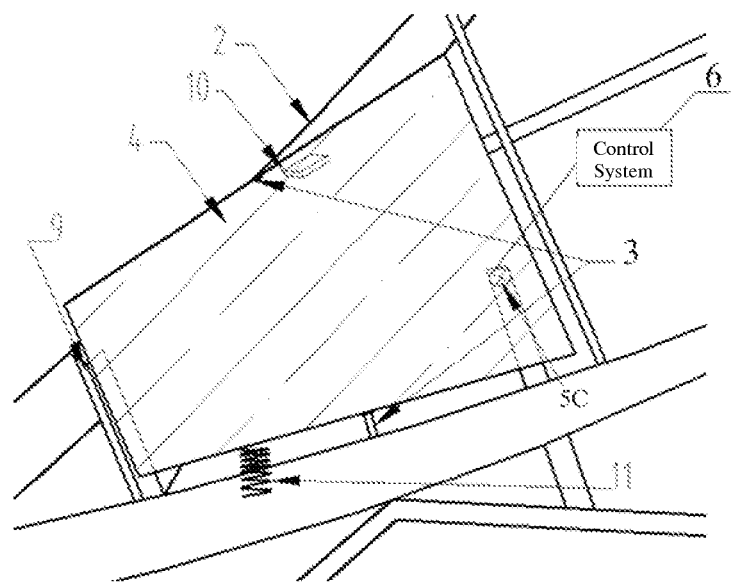
FIG. 5 illustrates the structure that an electric magnet drives the rotating reflection mirror.

FIG. 5 illustrates the structure that an electric magnet drives the rotating reflection mirror. FIG. 5 is a partial view of the disc-type concentrator shown in FIG. 1 for illustrating the working principle based on which an electric magnet drives the rotating reflection mirror. Compared with the disc-type concentrator shown in FIG. 4, the power driving device of the disc-type concentrator shown in FIG. 5 is an electric magnet 5C, and the remaining structure of the disc-type concentrator shown in FIG. 5 is the same as the structure of the disc-type concentrator shown in FIG. 4. As shown in FIG. 5, the electric magnet 5C is arranged on the back surface of the rotating reflection mirror 4 through a support post extended from the disc rack 2, and the electric magnet 5C directly acts on the rotating reflection mirror 4 to drive the rotating reflection mirror 4 to rotate through the support by the rotating shaft 3.

Preferably, the reset plate 9 and the rotation limiting plate 10 may not be provided with sensing elements.

The process that the electric magnet 5C drives the rotating reflection mirror 4 to rotate is specifically as follows: when the control system 6 receives a signal for reducing the concentrated energy by the disc-type concentrator, the control system 6 controls the electric magnet 5C to operate, the electric magnet 5C is powered on to drive the rotating reflection mirror 4 to start rotation, the reflected light of the rotating reflection mirror 4 starts to deviate from the heat collector of the solar heat utilization apparatus, the deformation of the reset spring 11 increases, when the rotating reflection mirror 4 approaches the rotation limiting plate 10, the output driving force of the electric magnet 5C remains unchanged, the balance between the rotating reflection mirror 4 and the reset spring 11 is maintained, and the operation to reduce the concentrated energy by the disc-type concentrator is completed; when the control system 6 receives a signal for increasing the concentrated energy by the disc-type concentrator, the control system 6 controls the electric magnet 5C to be powered off, under the action of the elastic potential energy generated by the deformation, the reset spring 11 drives the rotating reflection mirror 4 to rotate to the position of the reset plate 9, the operation to reset the rotating reflection mirror 4 is completed, and the concentrated energy by the disc-type concentrator starts to increase.

Apparently, the above examples are only special cases of a power driving device driving the rotating reflection mirror 4 to rotate. According to actual operation needs, different power driving devices or different combinations of power driving devices may be used to provide a driving force to the rotating reflection mirror.

Figure 6:
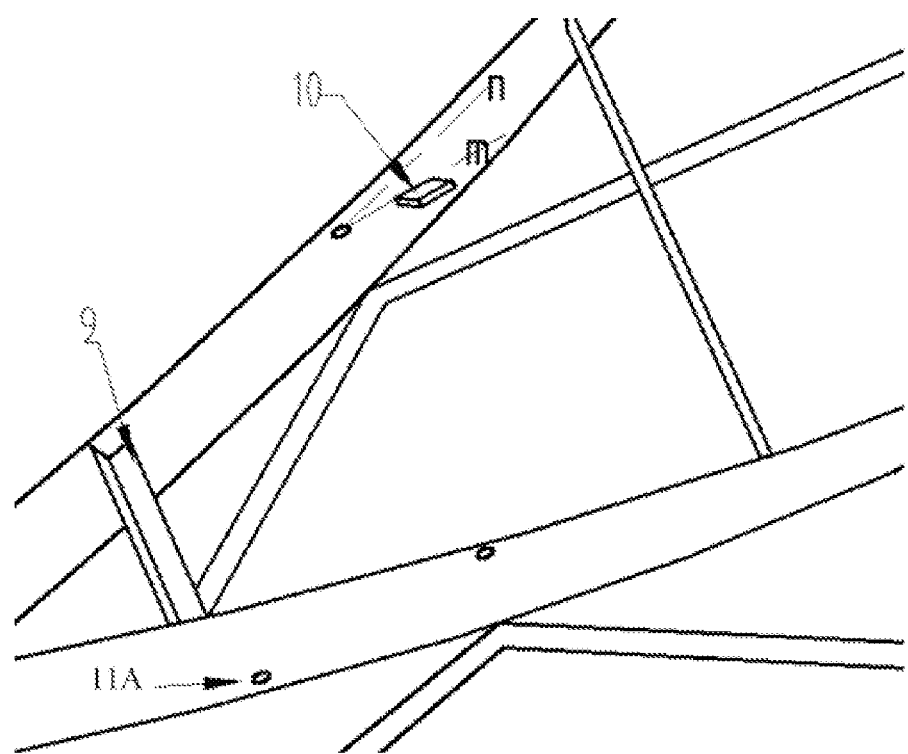
FIG. 6 illustrates the installation of the reset plate, the rotation limiting plate and the reset spring according to the present invention.

FIG. 6 illustrates the installation of the reset plate, the rotation limiting plate and the reset spring according to the present invention. As shown in FIG. 1 and FIG. 6, when the rotating reflection mirror 4 is at the position of the m line, the reflected light of the rotating reflection mirror 4 just deviates from the heat collector of the solar heat utilization apparatus 7, when the rotating reflection mirror 4 is at the position of the n line, the reflected light of the rotating reflection mirror 4 is just concentrated on the heat collector of the solar heat utilization apparatus 7. The reset plate 9 is fixedly installed on the disc rack 2, when the rotating reflection mirror 4 is at the position of the reset plate 9, the reflected light of the rotating reflection mirror 4 irradiates right into the heat collector of the solar heat utilization apparatus 7, i.e. at this moment, the rotating reflection mirror 4 is substantially parallel to the n line. The rotation limiting plate 10 is fixedly installed on the disc rack 2 with the position on the m line. The reset spring 11 is installed at the position of the disc rack 11A, and the preferred installation position of the reset spring 11 is that the distance between the reset spring 11 and the rotating shafts 3 is greater than ¼ of the installed edge of the rotating reflection mirror 4.

Figure 7:
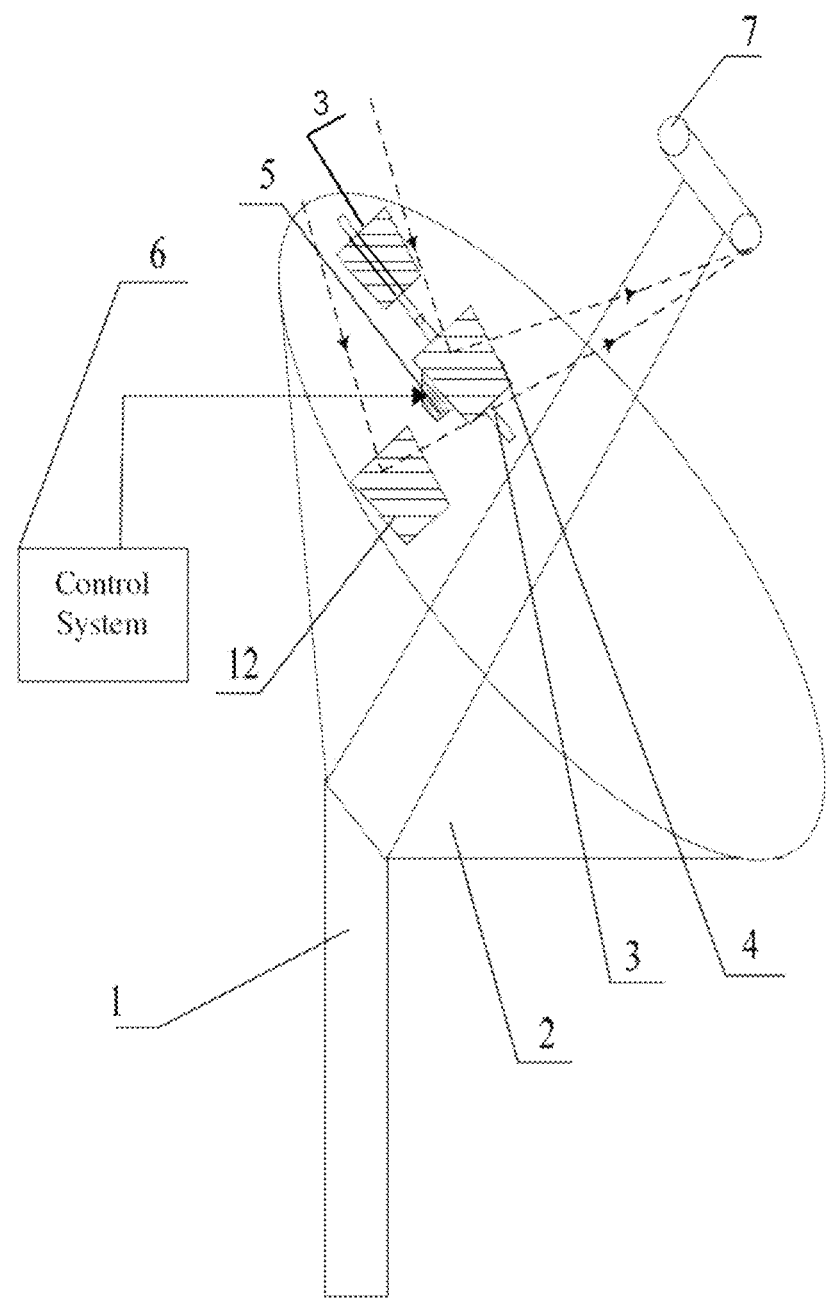
FIG. 7 illustrates the structure of Example II of a disc-type concentrator according to the present invention.

FIG. 7 illustrates the structure of Example II of a disc-type concentrator according to the present invention. Compared with the disc-type concentrator shown in FIG. 1, a fixed reflection mirror 12 is further provided in the disc rack 2 of the disc-type concentrator shown in FIG. 7, the fixed reflection mirror 12 does not rotate relative to the disc rack 2, and the arrangement position of the fixed reflection mirror 12 in the disc rack 2 should enable the reflected light by the fixed reflection mirror 12 to be focused on the heat collector of the solar heat utilization apparatus 7. The total amount of fixed reflection mirrors 12 and rotating reflection mirrors 4 is determined according to the energy required by the heat collector of the solar heat utilization apparatus 7 at the early stage of commissioning or during the normal operations thereof. The amount of rotating reflection mirrors 4 is determined according to the degree of adjustment to absorbed energy by the solar heat utilization apparatus 7, and the arrangement position of the rotating reflection mirror 4 in the disc rack 2 may be determined according to the difficulty in rotation of the rotating reflection mirror 4 in the disc rack 2 and the rotating balance of the disc rack 2. When the power of the disc-type concentrator needs to be decreased or the heat collector of the solar heat utilization apparatus 7 needs to be protected, the rotating reflection mirror 4 starts to rotate such that its reflected light deviates from the heat collector of the solar heat utilization apparatus 7, while the fixed reflection mirror 12 does not rotate, and its reflected light is still concentrated on the heat collector of the solar heat utilization apparatus 7, thereby achieving the effect of reducing the power of the disc-type concentrator and protecting the heat collector of the solar heat utilization apparatus 7; when the power of the disc-type concentrator needs to be increased, the rotating reflection mirror 4 starts to reset, and its reflected light is concentrated again on the heat collector of the solar heat utilization apparatus 7.

Preferably, the fixed reflection mirrors and the rotating reflection mirrors are arranged as a ring in the disc rack, the fixed reflection mirrors are preferably arranged on the external rings of the disc rack, and the rotating reflection mirrors are preferably arranged on the internal rings of the disc rack.

Figure 8:
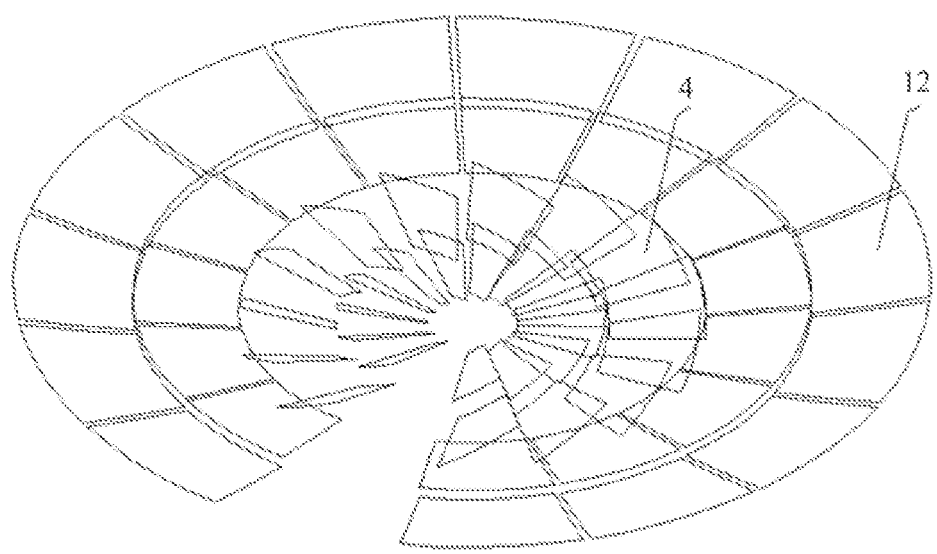
FIG. 8 illustrates the structure that the rotating reflection mirror rotates to the side circumferentially.
Figure 9:
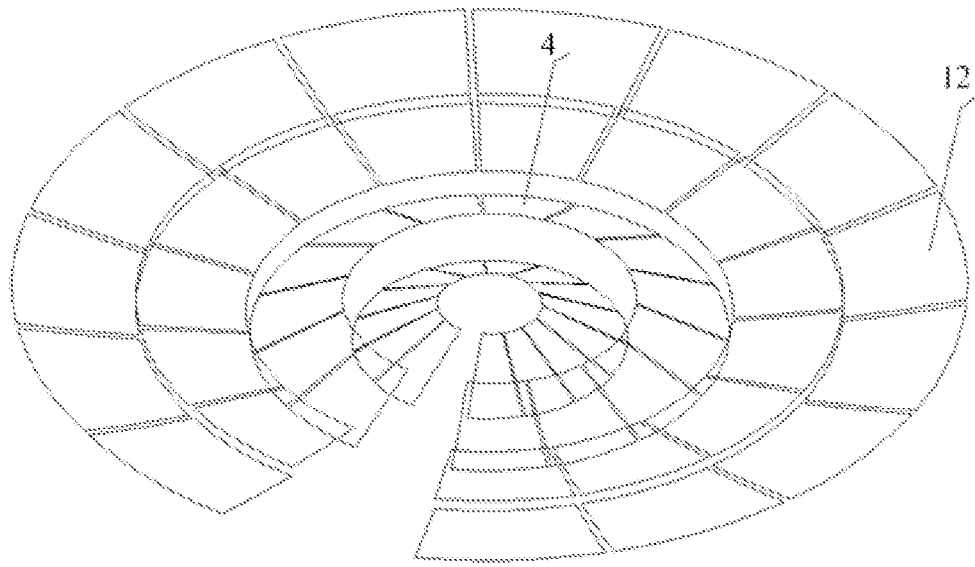
FIG. 9 illustrates the structure that the rotating reflection mirror turns inside out circumferentially.

FIG. 8 illustrates the structure that the rotating reflection mirror rotates to the side circumferentially, and FIG. 9 illustrates the structure that the rotating reflection mirror turns inside out circumferentially. As shown in FIG. 7, FIG. 8 and FIG. 9, the disc rack 2 has a ring structure with 4 internal and external layers, 2 internal ring layers of the disc rack 2 are a plurality of the rotating reflection mirrors 4, and 2 external ring layers thereof are a plurality of the fixed reflection mirrors 12. When the disc-type concentrator is in the normal working state, the reflected light from all rotating reflection mirrors 4 and fixed reflection mirrors 12 is concentrated on the heat collector of the solar heat utilization apparatus 7, when it is necessary to reduce the power of the disc-type concentrator or protect the heat collector of the solar heat utilization apparatus 7, the plurality of the rotating reflection mirrors 4 on the 2 internal ring layers rotate to the side circumferentially relative to the disc rack 2 with the structure shown in FIG. 8, or the plurality of the rotating reflection mirrors 4 on the 2 internal ring layers turn inside out circumferentially relative to the disc rack 2 with the structure shown in FIG. 9. The reflected light from the plurality of the rotating reflection mirrors 4 on the 2 internal ring layers deviates from the heat collector of the solar heat utilization apparatus 7, while the reflected light from the plurality of the fixed reflection mirrors 12 on the 2 external ring layers is still concentrated on the heat collector of the solar heat utilization apparatus 7, thereby realizing the adjustment to the concentrated energy by the disc-type concentrator; when it is necessary to restore the normal working state of the disc-type concentrator, the rotating reflection mirrors 4 start to reset.

Preferably, the plurality of the rotating reflection mirrors 4 on the same radial direction of the disc rack 2 may share one rotating shafts 3 and form an array of the rotating reflection mirrors 4. The amount of arrays of the rotating reflection mirrors 4 may be determined according to the degree of adjustment to absorbed energy by the solar heat utilization apparatus 7, and the arrangement position of arrays of the rotating reflection mirror 4 in the disc rack 2 may be determined according to the difficulty in rotation of arrays of the rotating reflection mirror 4 at said positions and the rotating balance of the disc rack 2.

Figure 10:
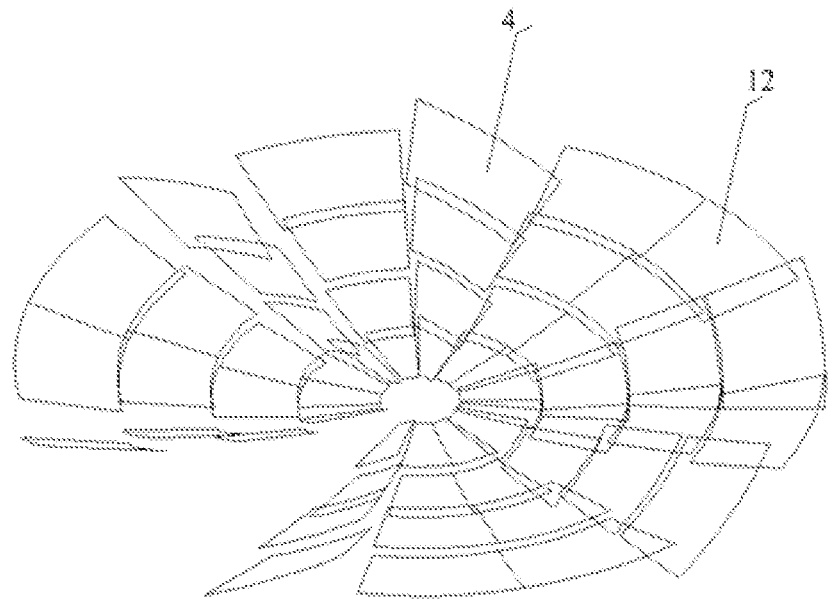
FIG. 10 illustrates the structure that the rotating reflection mirror rotates to the side radially.
Figure 11:
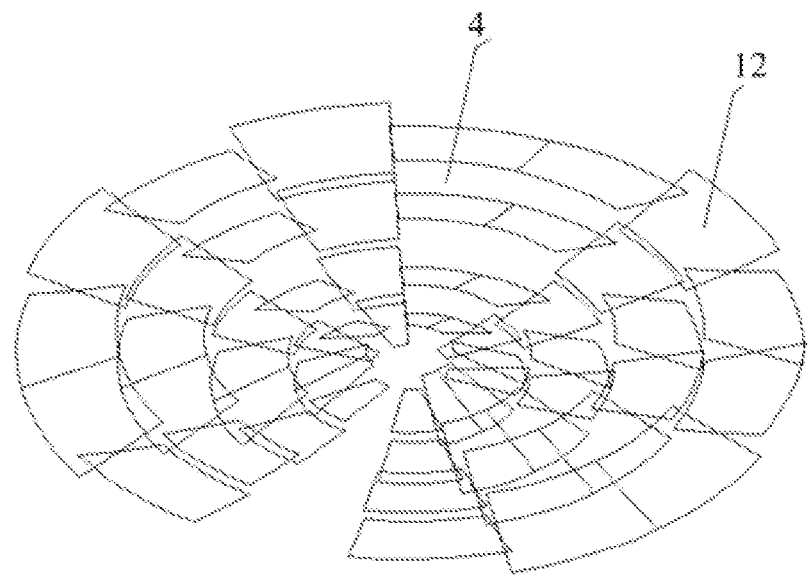
FIG. 11 illustrates the structure that the rotating reflection mirror turns inside out radially.

FIG. 10 illustrates the structure that the rotating reflection mirror rotates to the side radially, and FIG. 11 illustrates the structure that the rotating reflection mirror turns inside out radially. As shown in FIG. 7, FIG. 10 and FIG. 11, the rotating reflection mirrors 4 on the same radial direction of the disc rack 2 form an array of the rotating reflection mirrors 4. When the disc-type concentrator is in the normal working state, the reflected light from all arrays of the rotating reflection mirrors 4 and all fixed reflection mirrors 12 is concentrated on the heat collector of the solar heat utilization apparatus 7, when it is necessary to reduce the power of the disc-type concentrator or protect the heat collector of the solar heat utilization apparatus 7, the arrays of the rotating reflection mirrors 4 rotate to the side radially relative to the disc rack 2 with the structure shown in FIG. 10, or the arrays of the rotating reflection mirrors 4 turn inside out radially relative to the disc rack 2 with the structure shown in FIG. 11, the reflected light from the arrays of the rotating reflection mirrors 4 deviates from the heat collector of the solar heat utilization apparatus 7, while the reflected light from the fixed reflection mirrors 12 is still concentrated on the heat collector of the solar heat utilization apparatus 7, thereby realizing the adjustment to the concentrated energy by the disc-type concentrator; when it is necessary to restore the normal working state of the disc-type concentrator, the arrays of the rotating reflection mirrors 4 start to reset.

It should be noted that the working principles of the rotation of the rotating reflection mirrors 4 relative to the disc rack 2 and the reset of the rotating reflection mirrors 4 in this example are the same as the working principles of rotation and reset of the rotating reflection mirrors 4 in Example I. Therefore, the working principles of the rotation of the rotating reflection mirrors 4 relative to the disc rack 2 and the reset of the rotating reflection mirrors 4 in this example will not be described.

Preferably, the rotation direction of the rotating reflection mirrors 4 and the arrangement position of the rotating shaft 3 may be optionally determined provided that they are favorable for the design of the disc-type concentrator, and the rotation direction of the rotating reflection mirrors 4 is preferably turning inside out relative to the disc rack 2 or rotating to the side relative to the disc rack 2.

Preferably, to facilitate the rotation direction of the rotating reflection mirrors 4 and to maintain the stability of the disc rack 2, the shape of the disc rack 2 is preferably circular or polygonal.

Preferably, the rotating reflection mirrors 4 and the fixed reflection mirrors 12 are preferably linear compound parabolic reflectors, linear Fresnel lenses or reflectors, convex lenses, concave lenses, or linear parabolic reflectors.

Preferably, for the rotating reflection mirrors 4 with the reflected light therefrom deviating from the heat collector of the solar heat utilization apparatus 7, the reflected light may be concentrated on other solar heat utilization apparatuses to achieve the comprehensive utilization of solar energy.

It should be noted that the control principles for the control system 6 to control elements in the present invention are the same as the control principles according to the prior art, which will not be described herein.

The examples of the present invention disclose a disc-type concentrator that rotates a certain number of rotating reflection mirrors in response to the demand of a solar energy utilization apparatus, such that the reflected light from these rotating reflection mirrors deviates from or approaches the heat collector of the solar heat utilization apparatus, thereby promptly adjusting energy concentrated by the disc-type concentrator and adjusting the output power of the solar energy utilization apparatus.

The present invention further discloses a disc-type solar thermal power generation system comprising the above disc-type concentrator. Please refer to the prior art for the structures of other parts of the disc-type solar thermal power generation system, which will not be described herein.

The above description of the disclosed examples enables those skilled in the art to implement or use the present invention. It will be obvious to those skilled in the art to make a variety of modifications to these examples, and the general principles defined herein may be implemented in other examples without departing from the spirit or scope of the present invention. Therefore, the present invention will not be limited to these examples described herein, but has the widest possible scope that is consistent with the principles and novel features disclosed herein.

The invention claimed is:

1. A disc-type concentrator, comprising a disc rack vertical post and a disc rack, wherein said disc-type concentrator further comprises:
   a first rotating shaft with the two ends thereof arranged on the disc rack and rotatably connected with the disc rack;
   a rotating reflection mirror arranged on the side of the rotating shaft and fixedly connected with the rotating shaft;
   a power driving device arranged on the disc rack or on the back surface of the rotating reflection mirror and driving the rotating reflection mirror to rotate;
   a control system connected with the power driving device and controlling the working state of the power driving device;

a rotation limiting plate arranged on the disc rack to prevent the rotating reflection mirror from having an overly big rotation angle causing damage to the rotating reflection mirror; and a reset plate arranged on the disc rack with the same position as a normal working position of the rotating reflection mirror, the normal working position of the rotating reflection mirror being the position of the rotating reflection mirror when the reflected light of the rotating reflection mirror is concentrated on the working object of the disc-type concentrator.

2. The disc-type concentrator as set forth in claim 1, further comprising at least two rotating shaft supports disposed between the disc rack and the rotating reflection mirror, each of the rotating shaft supports is formed with a through-hole, the rotating shaft is in interference fit with the rotating shaft supports through the through-holes, the positions of the at least two rotating shaft supports are symmetrical about the center line of the rotating reflection mirror, and the center of gravity of the rotating reflection mirror falls on the left side of the rotating shaft supports.

3. The disc-type concentrator as set forth in claim 1, wherein the rotation limiting plate and the reset plate are provided with sensing elements, respectively, the sensing elements are connected to the control system, the power driving device is arranged on the disc rack, the power driving device is configured to rotates the rotating shaft through a power transmission element, the rotating shaft is configured to drives the rotating reflection mirror to rotate, and the control system is configured to controls the working state of the power driving device according to the information transmitted from the sensing element of the rotation limiting plate and the sensing element of the reset plate.

4. The disc-type concentrator as set forth in claim 1, further comprising a reset spring between the rotating reflection mirror and the disc rack, the power driving device is arranged on the back surface of the rotating reflection mirror, the driving power of the power driving device directly acts on the rotating reflection mirror, the rotating reflection mirror rotates through the support by the rotating shaft, and the reset spring is configured to resets the rotating reflection mirror to the position of the reset plate when the power driving device stops working.

5. The disc-type concentrator as set forth in claim 4, wherein the reset spring maintains certain deformation when the rotating reflection mirror is at the normal working position, and the reset plate limits the rotation of the rotating reflection mirror due to the deformation of the reset spring.

6. The disc type concentrator as set forth in claim 1, further comprising a plurality of the rotating reflection mirrors that are on the same radial direction of the disc rack are arranged on the same rotating shaft.

7. The disc-type concentrator as set forth in claim 1, wherein said disc-type concentrator further comprises fixed reflection mirrors that are fixedly arranged on the disc rack.

8. The disc-type concentrator as set forth in claim 7, characterized in wherein the fixed reflection mirrors and the rotating reflection mirrors are arranged as a ring in the disc rack, the fixed reflection mirrors are arranged on the external rings of the disc rack, and the rotating reflection mirrors are arranged on the internal rings of the disc rack.

9. A disc-type solar thermal power generation system, comprising a disc-type concentrator, an engine and a tracking control system, the disc-type concentrator comprising a disc rack vertical post and a disc rack, wherein said disc-type concentrator further comprises:

a rotating shaft with the two ends thereof arranged on the disc rack and rotatably connected with the disc rack;

a rotating reflection mirror arranged on the side of the rotating shaft and fixedly connected with the rotating shaft;

a power driving device arranged on the disc rack or on the back surface of the rotating reflection mirror and driving the rotating reflection mirror to rotate;

a control system connected with the power driving device and controlling the working state of the power driving device;

a rotation limiting plate arranged on the disc rack to prevent the rotating reflection mirror from having an overly big rotation angle causing damage to the rotating reflection mirror; and a reset plate arranged on the disc rack with the same position as the normal working position of the rotating reflection mirror, the normal working position of the rotating reflection mirror being the position of the rotating reflection mirror when the reflected light of the rotating reflection mirror is concentrated on the working object of the disc-type concentrator.

10. The system of claim 9, further comprising at least two rotating shaft supports disposed between the disc rack and the rotating reflection mirror, each of the rotating shaft supports is formed with a through-hole, the rotating shaft is in interference fit with the rotating shaft supports through the through-holes, the positions of the at least two rotating shaft supports are symmetrical about the center line of the rotating reflection mirror, and the center of gravity of the rotating reflection mirror falls on the left side of the rotating shaft supports.

11. The system of claim 9, wherein the rotation limiting plate and the reset plate are provided with sensing elements, respectively, the sensing elements are connected to the control system, the power driving device is arranged on the disc rack, the power driving device is configured to rotates the rotating shaft through a power transmission element, the rotating shaft is configured to drives the rotating reflection mirror to rotate, and the control system is configured to controls the working state of the power driving device according to the information transmitted from the sensing element of the rotation limiting plate and the sensing element of the reset plate.

12. The system of claim 9, further comprising a reset spring between the rotating reflection mirror and the disc rack, wherein the power driving device is arranged on the back surface of the rotating reflection mirror, wherein the driving power of the power driving device directly acts on the rotating reflection mirror, wherein the rotating reflection mirror rotates through the support by the rotating shaft, and the reset spring is configured to resets the rotating reflection mirror to the position of the reset plate when the power driving device stops working.

13. The system of claim 12, wherein the reset spring maintains certain deformation when the rotating reflection mirror is at the normal working position, and the reset plate limits the rotation of the rotating reflection mirror due to the deformation of the reset spring.

14. The system of claim 9, further comprising a plurality of the rotating reflection mirrors that are on the same radial direction of the disc rack arranged on the same rotating shaft.

15. The system of claim 9, wherein said disc-type concentrator further comprises fixed reflection mirrors that are fixedly arranged on the disc rack.

16. The system of claim 15, wherein the fixed reflection mirrors and the rotating reflection mirrors are arranged as a ring in the disc rack, the fixed reflection mirrors are arranged on the external rings of the disc rack, and the rotating reflection mirrors are arranged on the internal rings of the disc rack.

* * * * *